United States Patent
Vivanco et al.

(10) Patent No.: US 8,995,278 B1
(45) Date of Patent: Mar. 31, 2015

(54) MANAGING A WIRELESS DEVICE CONNECTION IN A MULTIOPERATOR COMMUNICATION SYSTEM

(71) Applicant: Sprint Spectrum LP, Overland Park, KS (US)

(72) Inventors: Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 149 days.

(21) Appl. No.: 13/797,164

(22) Filed: Mar. 12, 2013

(51) Int. Cl.
*H04J 3/14* (2006.01)
*H04W 36/22* (2009.01)

(52) U.S. Cl.
CPC ..................................... *H04W 36/22* (2013.01)
USPC .......................................... 370/237; 370/331

(58) Field of Classification Search
USPC ......... 370/230, 232, 235, 237, 238, 252, 331, 370/332; 455/411, 432.1, 452.1
See application file for complete search history.

(56) References Cited

U.S. PATENT DOCUMENTS

| | | | |
|---|---|---|---|
| 2010/0048205 A1* | 2/2010 | Guilford et al. | 455/432.1 |
| 2010/0103820 A1* | 4/2010 | Fuller et al. | 370/236 |
| 2011/0075563 A1* | 3/2011 | Leung et al. | 370/236 |
| 2011/0170410 A1 | 7/2011 | Zhao et al. | |
| 2012/0106346 A1* | 5/2012 | Aguirre et al. | 370/237 |
| 2012/0157092 A1 | 6/2012 | Agretti et al. | |

* cited by examiner

*Primary Examiner* — Edan Orgad
*Assistant Examiner* — Saumit Shah

(57) ABSTRACT

In operation, a plurality of data packets is received from a wireless device in communication with a first network, the data packets comprising an indication of first network congestion. The plurality of data packets are examined to determine an application requirement and a data rate of an application running on the wireless device. When a number of indications of first network congestion in relation to the data rate meets a congestion criteria, which can be based on the application requirement, a handover is performed to hand over the wireless device to a second network.

10 Claims, 6 Drawing Sheets

MANAGING A WIRELESS DEVICE CONNECTION IN A MULTIOPERATOR COMMUNICATION SYSTEM

TECHNICAL BACKGROUND

To increase the service areas in which wireless communications can be provided to wireless devices, network operators may permit wireless devices to communicate over the networks of different network operators, also referred to as "roaming." Network operators may not share certain performance data related to the communication of roaming wireless devices. For example, a wireless device's home network may not receive from a visited network information related to an amount of data sent or received by the wireless device while on the visited network, information related to visited network conditions such as congestion, data rates, data delay or latency, network load, wireless device application performance on the visited network, resource utilization, and the like. Consequently, a home network may be unable to accurately assess a user's experience on a visited network. Further, a home network may be unable to determine whether favorable conditions exist to instruct the wireless device to communicate over the home network rather than a visited network.

OVERVIEW

In operation, a plurality of data packets is received from a wireless device in communication with a first network, where the data packets comprise an indication of first network congestion. The plurality of data packets are examined to determine an application requirement and a data rate of an application running on the wireless device. When a number of indications of first network congestion in relation to the data rate meets a congestion criteria, a handover is performed to hand over the wireless device to a second network. The congestion criteria can be based on the application requirement.

DETAILED DESCRIPTION

Figure 1:
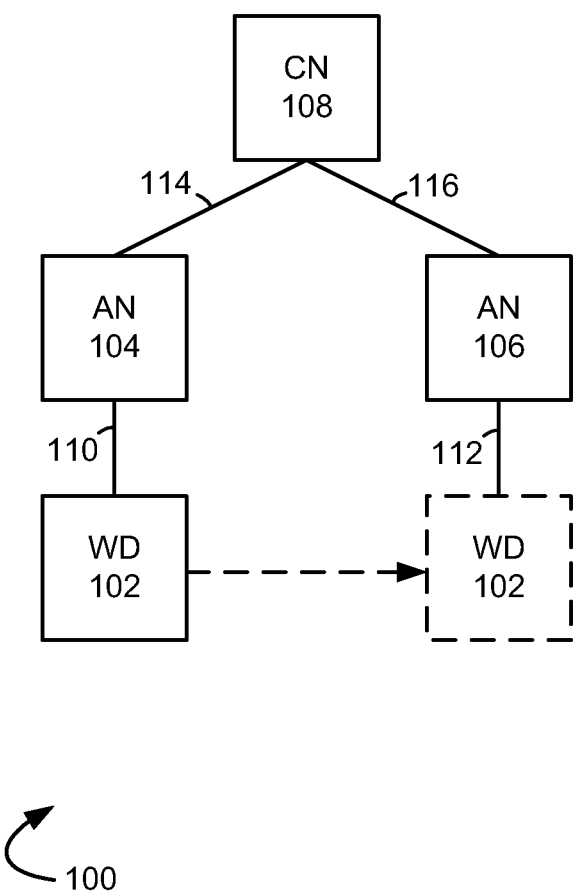
FIG. 1 illustrates an exemplary communication system to manage a wireless device connection.

FIG. 1 illustrates an exemplary communication system 100 to manage a wireless device connection comprising wireless device 102, access node 104, access node 106, and controller node 108. Examples of wireless device 102 can include a cell phone, a smart phone, a computing platform such as a laptop, palmtop, or tablet, a personal digital assistant, or an internet access device, including combinations thereof. Wireless device 102 can communicate with access node 104 over communication link 110, and with access node 106 over communication link 112. Wireless device 102 may communicate with both access nodes 104 and 106, or a handover, cell reselection, and the like can be performed to instruct wireless device 102 to change from communicating with access node 104 to communicating with access node 106.

Access nodes 104 and 106 are each a network node capable of providing wireless communications to wireless device 102, and can be, for example, a base transceiver station, a radio base station, an eNodeB device, or an enhanced eNodeB device. Access node 104 is in communication with controller node 108 over communication link 114, access node 106 is in communication with controller node 108 over communication link 116. In an embodiment, access node 104 can be associated with a first network, and access node 106 can be associated with a second network.

Controller node 108 can control the setup and maintenance of a communication session by wireless device 102. Controller node 108 can comprise a mobile switching center (MSC), a dispatch call controller (DCC), a call serving control function (CSCF), a mobility management entity (MME), or other similar network node. Controller node 108 can comprise a processor and associated circuitry to execute or direct the execution of computer-readable instruction. The computer-readable instructions can be retrieved and executed from storage, which can include a disk drive, flash drive, memory circuitry, or some other memory device, and which can be local or remotely accessible. The software can comprise computer programs, firmware, or some other form of machine-readable instructions, and may include an operating system, utilities, drivers, network interfaces, applications, or some other type of software, including combinations thereof. Controller node 108 can receive instructions and other input at a user interface.

Communication links 110, 112, 114, and 116 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, access node 106 and controller node 108 which are omitted for clarity, including additional processing nodes, routers, gateways, and physical and/or wireless data links for carrying data among the various network elements.

In operation, a plurality of data packets is received from a wireless device 102 which is in communication with a first network (for example, in communication with access node 104 which is associated with the first network), where the data packets comprise an indication of first network congestion. The plurality of data packets are examined to determine an application requirement and a data rate of an application running on wireless device 102. When a number of indications of first network congestion in relation to the data rate meets a congestion criteria, a handover is performed to hand over wireless device 102 from the first network to a second network. In an embodiment, wireless device 102 can be handed over from access node 104, which can be associated with a first network, to access node 106, which can be associated with a second network. The congestion criteria can be based on the application requirement of the application running on wireless device 102, as further described below.

Figure 2:
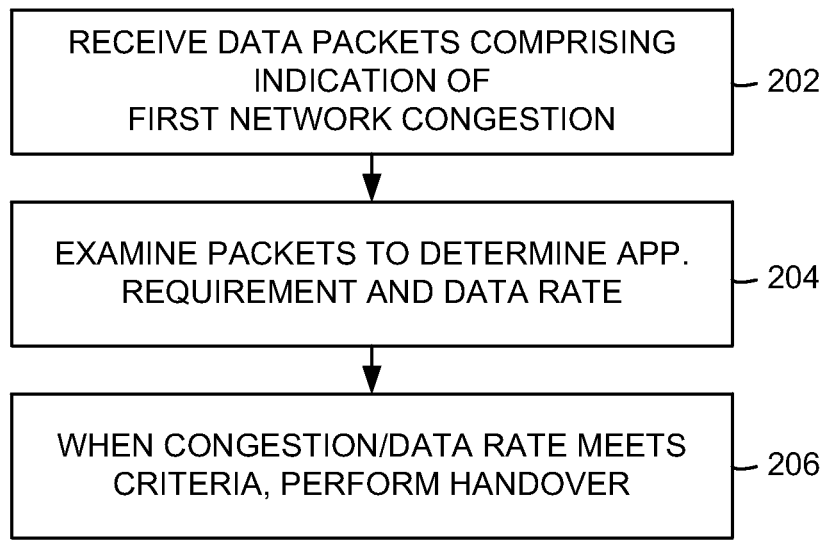
FIG. 2 illustrates an exemplary method of managing a wireless device connection.

FIG. 2 illustrates an exemplary method of managing a wireless device connection. In operation 202, a plurality of data packets are received from a wireless device in communication with a first network, the data packets comprising an indication of first network congestion. For example, a plurality of data packets can be received from wireless device 102 at access node 104, and the plurality of data packets can further be received at controller node 108. The plurality of data packets may also be received at another network node.

Figure 3:
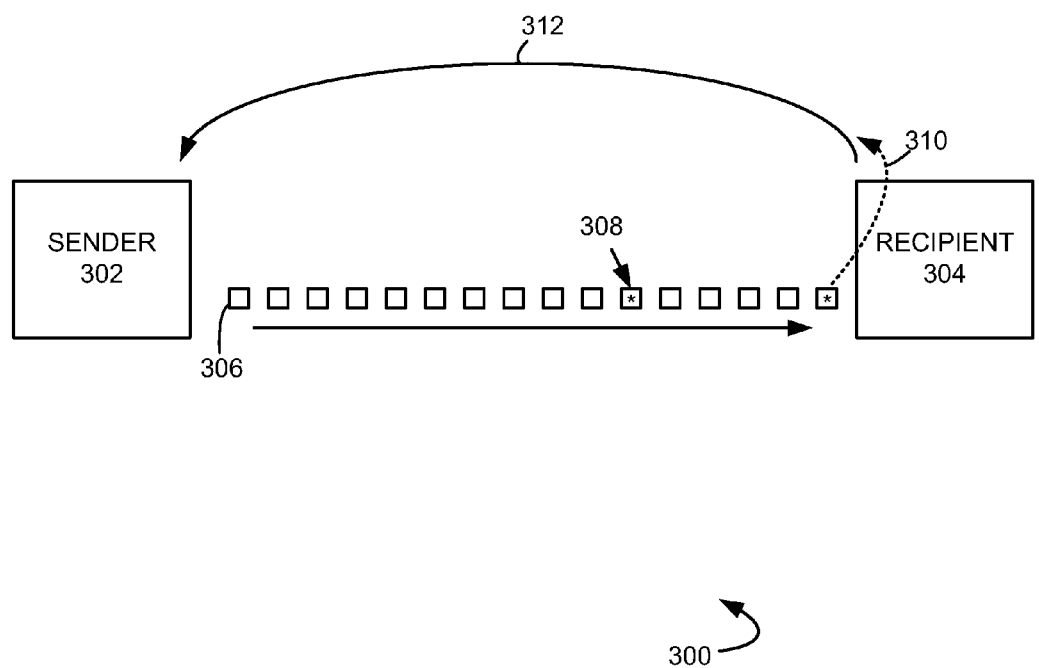
FIG. 3 illustrates an exemplary system wherein data packets comprise an indication of network congestion.

The received data packets can comprise an indication of network congestion. For example, FIG. 3 illustrates an exemplary system 300 wherein data packets comprise an indication of network congestion. Sender network element 302 can send data packets 306 destined for recipient 304. For example, sender 302 could be a network element which sends packets requested by recipient 304. Intermediate network elements, such as a switch or a router (not illustrated) can pass data packets 306 from the sender 302 to recipient 304. One example of a system enabling data packets to comprise an indication of network congestion includes Explicit Congestion Notification (ECN), an extension of the Transfer Control Protocol (TCP).

Typically, TCP includes congestion control and avoidance methods that determine an appropriate congestion window for a network node or element by increasing the traffic through the network node until packet loss is detected. The use of an additive increase/multiplicative decrease feedback control algorithm in TCP causes a dramatic reduction in the rate of packet transmission from a network node when congestion is detected. Typically, TCP only enables endpoints to detect and address network node congestion. In addition, detected congestion is mitigated by dropping and retransmitting packets.

The ECN extension to TCP enables end-to-end notification of network congestion without dropping packets, allowing recipient 304 to receive the packet or packets which would otherwise have been dropped and avoiding packet retransmission. When ECN together with an active queue management (AQM) policy is implemented on intermediate network elements, incipient congestion can be detected at the network elements, for example at intermediate network elements. When congestion is detected, rather than dropping a packet, a packet can be marked to indicate network congestion. In FIG. 3, packet 308 is marked to indicate network congestion (symbolized by a packet with an asterisk). In an embodiment, according to ECN, a codepoint in a field in a header of the packet can be marked to indicate that congestion is encountered (CE). Thus, packet 308 comprises an indication of network congestion. When recipient 304 receives a packet marked to indicate congestion, the recipient 304 can send a message 310 based on the receipt of the congestion-marked packet to the sender through a feedback path 312. In an embodiment, message 310 signals the sender 302 to reduce its congestion window, similar to typical TCP behavior (i.e., TCP without ECN implemented). In response, the sender 302 can reduce its packet transmission rate to alleviate the congestion detected in the network.

Returning to FIG. 2, in operation 204, the plurality of data packets are examined to determine an application requirement and a data rate of an application running on the wireless device. For example, when the plurality of data packets is received from wireless device 102, the plurality of data packets can be examined. Examining data packets can comprise performing deep packet inspection of packets sent from wireless device 102. Deep packet inspection generally involves an inspection of packets beyond Open Systems Interconnection (OSI) layer 3 including an inspection of the data portion of a packet (and possibly also the header of a packet). When the data packets are examined, an application running on wireless device 102 can be characterized. For example, a type of application running on wireless device 102 can be determined, such as a latency-sensitive application (for example, a voice over internet protocol (VoIP) or similar voice application, a streaming video application, a streaming audio application, a download stream, and the like) and a non-latency sensitive application (for example, an internet browser application, an email application, a text messaging application, and the like). Further, an application requirement of the determined application of type of application can be determined, such as a required minimum data rate, a maximum permitted data delay, a maximum data error rate, and the like, to enable the determined application (or application type) to meet a minimum performance threshold.

In addition, a data rate of the application running on the wireless device can also be determined. For example, an actual data utilization, such as a measurement of data sent to and/or received from the application running on wireless device 102 can be determined. As one example, the determined application can be a latency-sensitive application, such as a VoIP application, but the application may not be involved in a call session, in which case the data rate of the application would be comparatively low. As another example, the determined application be an internet browser application, which is typically not latency-sensitive, but the determined application may be downloading a stream of data from a data-heavy internet site. In other words, both the application running on the wireless device and the data rate of the application can be determined. In an embodiment, the data rate can comprise an aggregated data rate over a period of time, or an average, or a running average, or some other aggregation of data rate measurements, or the data rate can comprise an instantaneous determination of the application data rate.

In operation 206, a handover is performed of the wireless device to a second network when a number of indications of first network congestion in relation to the data rate meets a congestion criteria, wherein the congestion criteria is based on the application requirement. For example, from among the plurality of data packets received from wireless device 102, a number of data packets which comprise the indication of network congestion can be determined. When the number of data packets which comprise the indication of network congestion meets a congestion criteria, a handover can be performed to hand over wireless device from access node 104 (which can be associated with a first network) to access node 106 (which can be associated with a second network). The congestion criteria can be determined based on the determined application requirement (such as a required minimum data rate, a maximum permitted data delay, a maximum data error rate, and the like). In an embodiment, when the number of data packets comprising an indication of network congestion meets a congestion criteria, which can indicate that network congestion is interfering or is approaching a level which may interfere with the performance of the application running on wireless device 102, a handover may be performed to hand over wireless device from access node 104 to access node 106.

Figure 4:
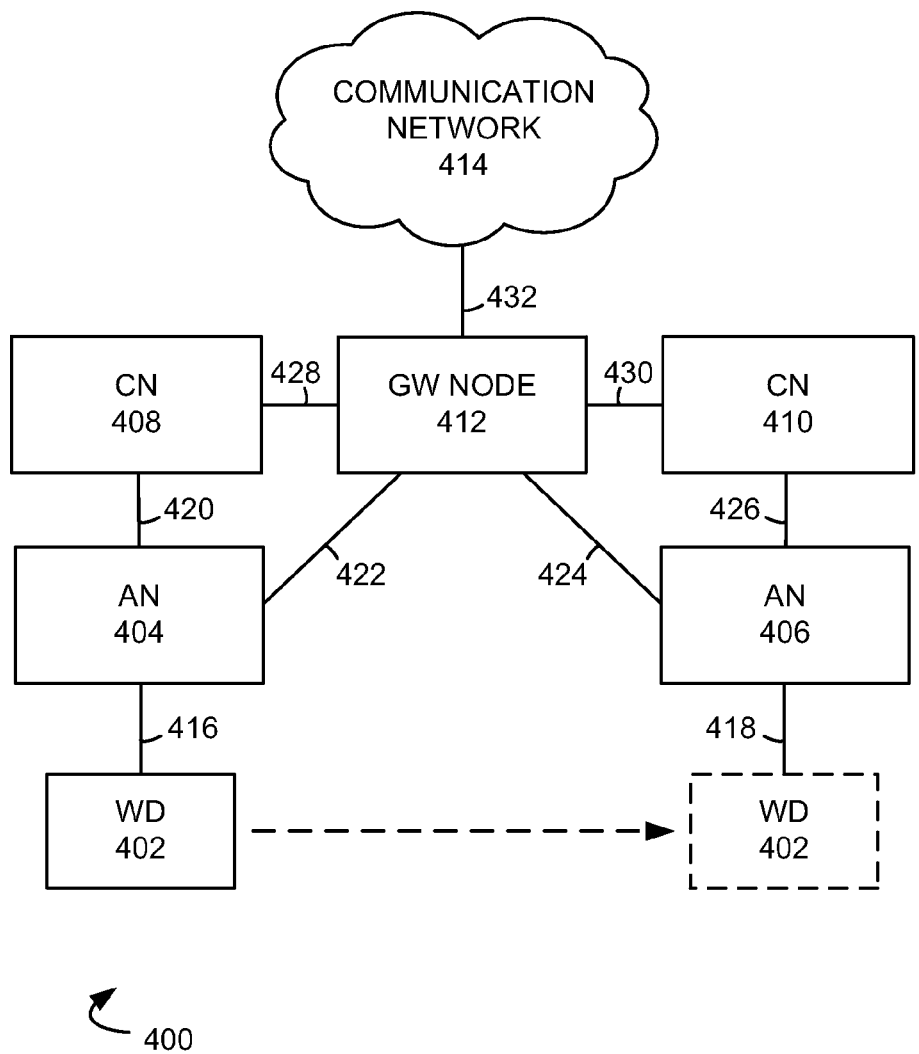
FIG. 4 illustrates another exemplary communication system to manage a wireless device connection.

FIG. 4 illustrates another exemplary communication system 400 to manage a wireless device connection comprising wireless device 402, access node 404, access node 406, controller node 408, controller node 410, gateway node 412, and communication network 414. Examples of wireless device 402 can include a cell phone, a smart phone, a computing platform such as a laptop, palmtop, or tablet, a personal digital assistant, or an internet access device, including combinations thereof. Wireless device 402 can communicate with access node 404 over communication link 416, and with access node 406 over communication link 418. Wireless device 402 may communicate with both access nodes 404 and 406, or a handover, cell reselection, and the like can be performed to instruct wireless device 402 to change from communicating with access node 404 to communicating with access node 406.

Access nodes 404 and 406 are each a network node capable of providing wireless communications to wireless device 402, and can be, for example, a base transceiver station, a radio base station, an eNodeB device, or an enhanced eNodeB device. Access node 404 is in communication with controller node 408 over communication link 420 and with gateway node 412 over communication link 422. Access node 406 is in communication with controller node 410 over communication link 426 and with gateway node 412 over communication link 424. In an embodiment, access node 404 and controller node 408 can be associated with a first network, and access node 406 and controller node 410 can be associated with a second network.

Controller nodes 408 and 410 can each control the setup and maintenance of a communication session by wireless device 402. Controller nodes 408 and 410 can comprise a mobile switching center (MSC), a dispatch call controller (DCC), a call serving control function (CSCF), a mobility management entity (MME), or other similar network node. Controller nodes 408 and 410 can comprise a processor and associated circuitry to execute or direct the execution of computer-readable instruction. The computer-readable instructions can be retrieved and executed from storage, which can include a disk drive, flash drive, memory circuitry, or some other memory device, and which can be local or remotely accessible. The software can comprise computer programs, firmware, or some other form of machine-readable instructions, and may include an operating system, utilities, drivers, network interfaces, applications, or some other type of software, including combinations thereof. Controller nodes 408 and 410 can receive instructions and other input at a user interface.

Gateway node 412 is a network element which can comprise a processor and associated circuitry to execute or direct the execution of computer-readable instructions. Gateway node 412 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 412 can serve as an interface between controller nodes 408 and 410 and communication network 414. Gateway node 412 can be for example, a standalone computing device or network element, such as a serving gateway (S-GW) or similar network element, or the functionality of gateway node 412 can be incorporated into, or may be distributed across, one or more network elements. Gateway node 412 can, among other things, be configured to function as an inspection node to perform deep packet inspection of packets sent from and/or to wireless device 302. Deep packet inspection generally involves an inspection of packets beyond Open Systems Interconnection (OSI) layer 3 including an inspection of the data portion of a packet (and possibly also the header of a packet). Gateway node 412 can also be configured to perform as an aggregation router, which can communicate with and receive information from the first network (e.g., access node 404 and controller node 408) and the second network (e.g., access node 406 and controller node 410). In an embodiment, gateway node 412 can be a network element of the second network capable of communication with network elements of the first network. In an embodiment, gateway node 412 can be an inspection node of the first network capable of communication with network elements of the second network.

Communication network 414 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 414 can be capable of carrying voice information and other data, for example, to support communications with wireless device 402. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 414 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 414 may also comprise a wireless network, including base stations, wireless communication nodes, telephony switches, internet routers, network gateways, computer systems, communication links, or some other type of communication equipment, and combinations thereof.

Communication links 416, 418, 420, 422, 424, 426, 428, 430 and 432 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 404, access node 406, controller node 408, controller node 410, gateway node 412, and communication network 414 which are omitted for clarity, including additional processing nodes, routers, gateways, and physical and/or wireless data links for carrying data among the various network elements.

Figure 5:
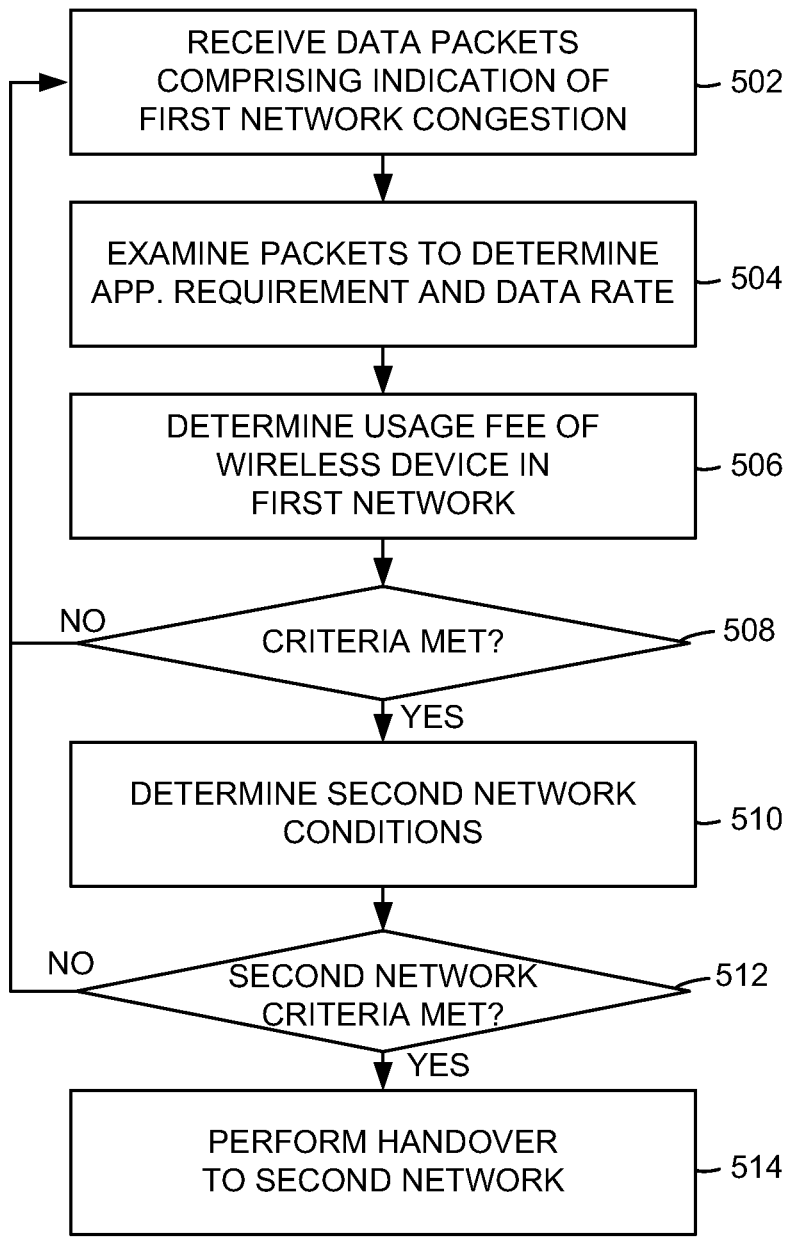
FIG. 5 illustrates another exemplary method of managing a wireless device connection.

FIG. 5 illustrates another exemplary method of managing a wireless device connection. In operation 502, a plurality of data packets are received from a wireless device in communication with a first network, the data packets comprising an indication of first network congestion. For example, a plurality of data packets can be received from wireless device 402 at access node 404, and the plurality of data packets can further be received at controller node 408 and/or gateway node 412. The received data packets can comprise an indication of network congestion, such as described above with respect to FIG. 3.

In operation 504, the plurality of data packets are examined to determine an application requirement and a data rate of an application running on the wireless device. For example, when the plurality of data packets is received from wireless device 402, the plurality of data packets can be examined. Examining data packets can comprise performing deep packet inspection of packets sent from wireless device 402. When the data packets are examined, an application running on wireless device 402 can be characterized. For example, a type of application running on wireless device 402 can be determined, such as a latency-sensitive application (for example, a voice over internet protocol (VoIP) or similar voice application, a streaming video application, a streaming audio application, a download stream, and the like) and a non-latency sensitive application (for example, an internet browser application, an email application, a text messaging application, and the like). Further, an application requirement of the determined application of type of application can be determined, such as a required minimum data rate, a maximum permitted data delay, a maximum data error rate, and the like, to enable the determined application (or application type) to meet a minimum performance threshold.

In addition, a data rate of the application running on the wireless device can also be determined. For example, an actual data utilization, such as a measurement of data sent to and/or received from the application running on wireless device 402 can be determined. As one example, the determined application can be a latency-sensitive application, such as a VoIP application, but the application may not be involved in a call session, in which case the data rate of the application would be comparatively low. As another example, the determined application be an internet browser application, which is typically not latency-sensitive, but the determined application may be downloading a stream of data from a data-heavy internet site. In other words, both the application running on the wireless device and the data rate of the application can be determined. In an embodiment, the data rate can comprise an aggregated data rate over a period of time, or an average, or a running average, or some other aggregation of data rate measurements, or the data rate can comprise an instantaneous determination of the application data rate.

In operation 506, a usage fee of the wireless device in the first network is determined based on the application running on the wireless device and the data rate of the application. For example, it can be determined that a VoIP application running wireless device 402 is involved in a communication session, and that the VoIP application is sending and receiving data at a determined data rate. In an embodiment, a total amount of data sent and/or received by wireless device 402 during the communication session can be determined. Further, a usage fee associated with the use of data on the first network can be determined for wireless device 402, for example, where the use of data on the first network is associated with a cost or charge. In an example, the usage fee can be a roaming charge where wireless device 402 is associated with the second network and communicates over the first network pursuant to a roaming agreement or similar permission. In another example, communication over the first network by wireless device 402 can be subject to charge or cost based on a data rate, a total amount of data sent and/or received over the first network, and the like.

In operation 508, it is determined whether at least one of several criteria are met. For example, it can be determined that a number of data packets comprising the indication of network congestion according to the data rate meets a congestion criteria. The congestion criteria can be determined based on the determined application requirement (such as a required minimum data rate, a maximum permitted data delay, a maximum data error rate, and the like). In an embodiment, when the number of data packets comprising an indication of network congestion meets a congestion criteria, which can indicate that network congestion is interfering or is approaching a level which may interfere with the performance of the application running on wireless device 402, a handover may be performed to hand over wireless device from access node 404 to access node 406.

In addition, it can be determined that the usage fee meets a fee criteria. The fee criteria can be determined based on a roaming agreement or similar network use authorization, a charge or cost to communicate of the first network based on a data rate, or a total amount of data sent over the first network, and the like. The fee criteria can comprise a maximum fee, a threshold fee, a fee range, or similar criteria. When the criteria are not met (operation 508—NO), further data packets can be received from wireless device 402 (operation 502).

When one or more criteria are met (operation 508—YES), second network conditions are determined (operation 510). Second network conditions can comprise conditions sufficient to meet the application requirement of the application running on the wireless device. For example, the second network condition can comprise a signal level, a data rate, a throughput, a channel utilization of a channel of the second network, a level of second network congestion on a communication link and/or a second network backhaul, an available modulation and coding scheme on one or more communication links, and the like, including combinations thereof. The second network criteria can comprise second network conditions sufficient to meet the application requirement of the application running on wireless device 402 (such as, for example, a utilization criteria, or a congestion criteria). When the second network conditions do not meet the second network criteria (operation 512—NO), further data packets can be received from wireless device 402 (operation 502)

When the second network conditions meet the second network criteria (operation 512—YES), a handover is performed to hand over the wireless device to the second network (operation 514). In an embodiment, a handover can be performed when a number of data packets comprising the indication of network congestion according to the data rate meets a congestion criteria and the second network condition meets the application requirement of wireless device 402. In an embodiment, the first network can comprise a visited network, and the second network can comprise a home network of wireless device 402.

In an embodiment, a handover can be performed when a number of data packets comprising the indication of network congestion according to the data rate meets a congestion criteria and the second network congestion meets a second congestion criteria. In an embodiment, the handover can be performed when a number of data packets comprising the indication of network congestion according to the data rate meets a congestion criteria and the second network condition meets the application requirement of the application running on the wireless device.

In an embodiment, a handover can be performed when a number of data packets comprising the indication of network congestion according to the data rate meets a congestion criteria and the usage fee meets a fee criteria. In an embodiment, the handover can be performed when a number of data packets comprising the indication of network congestion according to the data rate meets a congestion criteria, the usage fee meets a fee criteria, and the channel utilization of the channel of the second network meets a utilization criteria. In an embodiment, the handover can be performed when a number of data packets comprising the indication of network congestion according to the data rate meets a congestion criteria, the usage fee meets a fee criteria, and the second network congestion meets a second congestion criteria.

Figure 6:
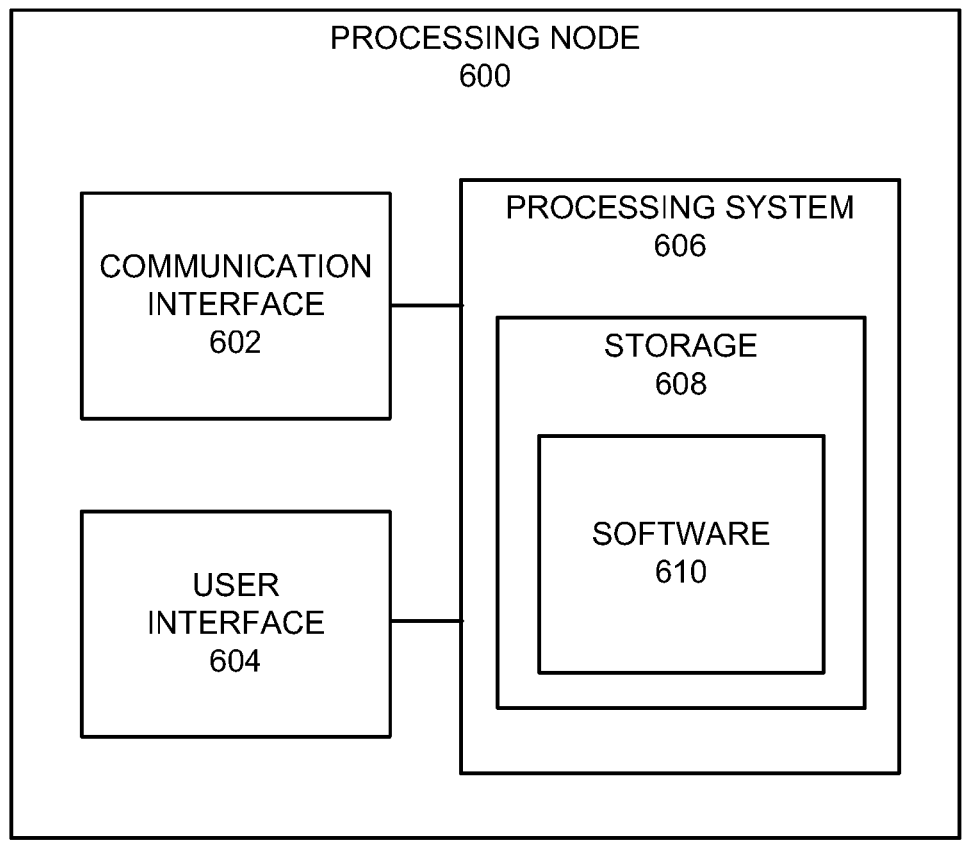
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 is capable of managing a wireless device connection in a communication system. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 108, controller node 408, controller node 410, and gateway node 412. Processing node can also be an adjunct or component of a network element, or the functionality of processing node 600 can be distributed over two or more network elements. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing a wireless device connection, comprising:
    transmitting a plurality of marked data packets from an access node to a wireless device in communication with a first network;
    receiving a plurality of feedback data packets from the wireless device at the access node, wherein each of the plurality of feedback data packets are associated with at least one of the plurality of marked data packets and at least one of the plurality of feedback data packets comprise an indication of first network congestion;
    inspecting the plurality of feedback data packets received at the access node for first network condition information associated with the wireless device to determine that the first network meets a first congestion criteria, wherein the first congestion criteria is based on the first network condition information associated with the wireless device and a number of feedback data packets indicating first network congestion;
    determining a usage fee of the wireless device associated with the first network condition information and a data rate of the first network condition information;
    detecting a second network that meets a second congestion criteria; and
    performing a handover of the wireless device to the second network when the number of feedback data packets indicating first network congestion meets the first congestion criteria and the usage fee meets a fee criteria.

2. The method of claim 1, wherein inspecting the plurality of feedback data packets is performed at an inspection node in communication with the first access node and in communication with the first network and the second network.

3. The method of claim 1, wherein the indication of first network congestion comprises explicit network congestion (ECN) information of the first network received at the second network.

4. The method of claim 1, further comprising:
    performing the handover of the wireless device to the second network when the number of feedback data packets indicating first network congestion meets the first congestion criteria and the second network meets the second congestion criteria,
    wherein the first congestion criteria is based on a data rate of the first network condition information associated with the wireless device and the second congestion criteria is based on an application requirement of an application running on the wireless device.

5. A method of managing a wireless device connection, comprising:
    transmitting a plurality of marked data packets to a wireless device in communication with a first network;
    receiving a plurality of feedback data packets from the wireless device at an inspection node, wherein each of the plurality of feedback data packets are associated with at least one of the plurality of marked data packets and at least one of the plurality of feedback data packets comprises an indication of first network congestion;

inspecting the plurality of feedback data packets to determine an application requirement of an application running on the wireless device and a data rate of the application;

determining a usage fee associated with the application running on the wireless device and the data rate of the application;

detecting a second network that meets a channel utilization criteria; and performing a handover of the wireless device to the second network when a number of the feedback data packets meets a congestion criteria, the usage fee meets a fee criteria, wherein the congestion criteria is based on the data rate of the application.

6. The method of claim 5, wherein the inspection node in communication with the first network and the second network.

7. A system for managing a wireless device connection, comprising:

a processing node configured to transmit a plurality of marked data packets from an access node to a wireless device in communication with a first network;

receive a plurality of feedback data packets from the wireless device at the access node, wherein each of the plurality of feedback data packets are associated with at least one of the plurality of marked data packets and at least one of the plurality of feedback data packets comprise an indication of first network congestion;

inspect each of the plurality of feedback data packets received at the access node for first network condition information associated with the wireless device to determine that the first network meets a first congestion criteria, wherein the first congestion criteria is based on the first network condition information associated with the wireless device and a number of feedback data packets indicating first network congestion;

determine a usage fee of the wireless device based on the first network condition information associated with the wireless device and a data rate of the first network condition information;

detect a second network that meets a second congestion criteria; and initiate performance of a handover of the wireless device to the second network when the number of feedback data packets indicating first network congestion meets the first congestion criteria and the usage fee meets a fee criteria.

8. The system of claim 7, wherein the indication of first network congestion comprises explicit network congestion (ECN) information of the first network received at the second network.

9. The system of claim 7, wherein the processing node is further configured to:

initiate performance of the handover of the wireless device to the second network when the number of feedback data packets indicating first network congestion meets the first congestion criteria and the second network meets the second congestion criteria, wherein the first congestion criteria is based on a data rate of the first network condition information associated with the wireless device and the second congestion criteria is based on an application requirement of an application running on the wireless device.

10. The system of claim 7, wherein the processing node is further configured to:

determine that the second network meets a channel utilization criteria; and initiate performance of a handover of the wireless device to the second network when the number of feedback data packets meets the first congestion criteria, the usage fee meets the fee criteria, and the channel utilization of the second network meets the utilization criteria.

\* \* \* \* \*